(12) United States Patent
Karlsen et al.

(10) Patent No.: US 10,226,837 B2
(45) Date of Patent: Mar. 12, 2019

(54) THERMAL PROCESSING WITH LINE BEAMS

(71) Applicant: nLight Photonics Corporation, Vancouver, WA (US)

(72) Inventors: Scott R. Karlsen, Battle Ground, WA (US); Keith Kennedy, Vancouver, WA (US); Robert J. Martinsen, West Linn, OR (US)

(73) Assignee: nLIGHT, Inc., Vancouver, WA (US)

( * ) Notice: Subject to any disclaimer, the term of this patent is extended or adjusted under 35 U.S.C. 154(b) by 283 days.

(21) Appl. No.: 13/837,647

(22) Filed: Mar. 15, 2013

(65) Prior Publication Data

US 2014/0263208 A1 Sep. 18, 2014

(51) Int. Cl.
*B23K 26/00* (2014.01)
*B23K 26/06* (2014.01)
*B23K 26/073* (2006.01)
*B23K 26/36* (2014.01)
*B23K 26/211* (2014.01)
(Continued)

(52) U.S. Cl.
CPC ...... *B23K 26/0608* (2013.01); *B23K 26/0613* (2013.01); *B23K 26/0622* (2015.10); *B23K 26/0732* (2013.01); *B23K 26/0738* (2013.01); *B23K 26/211* (2015.10);
(Continued)

(58) Field of Classification Search
CPC ............ B23K 26/0081; B23K 26/0608; B23K 26/0613; B23K 26/063; B23K 26/0732; B23K 26/0738; B23K 26/203; B23K 26/36; B23K 26/421; H01L 21/22

USPC ............ 219/121.6, 121.63, 121.64, 121.72, 219/121.73, 121.76, 121.78
See application file for complete search history.

(56) References Cited

U.S. PATENT DOCUMENTS 4,138,190 A 2/1979 Bryngdahl
4,252,403 A 2/1981 Salisbury
(Continued)

FOREIGN PATENT DOCUMENTS

CN 1508844 6/2004
CN 1531023 9/2004
(Continued)

OTHER PUBLICATIONS

Notice of Preliminary Rejection from Korean Patent Application No. 10-2014-0029473, dated Jul. 27, 2015, 12 pages (with English translation).
(Continued)

*Primary Examiner* — Dana Ross
*Assistant Examiner* — Joseph Iskra
(74) *Attorney, Agent, or Firm* — Klarquist Sparkman, LLP (57) ABSTRACT

Multi-beam, multi-wavelength processing systems include two or more lasers configured to provide respective beams to a substrate. The beams have wavelengths, pulse durations, beam areas, beam intensities, pulse energies, polarizations, repetition rates, and other beam properties that are independently selectable. Substrate distortion in processes requiring local heating can be reduced by preheating with a large area beam at a first wavelength followed by exposure to a focused beam at a second wavelength so as to heat a local area to a desired process temperature. For some processing, multiple wavelengths are selected to obtain a desired energy deposition within a substrate.

23 Claims, 6 Drawing Sheets

(51) Int. Cl.
  *B23K 26/0622* (2014.01)
  *B23K 26/60* (2014.01)
  *B23K 26/354* (2014.01)

(52) U.S. Cl.
  CPC ............ *B23K 26/354* (2015.10); *B23K 26/36* (2013.01); *B23K 26/60* (2015.10)

(56) References Cited

U.S. PATENT DOCUMENTS

| | | |
|---|---|---|
| 4,266,851 A | 5/1981 | Salisbury |
| 4,475,027 A | 10/1984 | Pressley |
| 4,498,951 A | 2/1985 | Tamura et al. |
| 5,081,636 A * | 1/1992 | Bishop ................ H01S 3/025 372/70 |
| 5,153,773 A | 10/1992 | Muraki et al. |
| 5,224,200 A | 6/1993 | Rasmussen |
| 5,256,164 A | 10/1993 | Mooradian |
| 5,388,114 A | 2/1995 | Zarrabi et al. |
| 5,463,497 A | 10/1995 | Muraki et al. |
| 5,475,415 A | 12/1995 | Noethen |
| 5,864,430 A | 1/1999 | Dickey et al. |
| 5,986,807 A | 11/1999 | Fork |
| 6,072,184 A | 6/2000 | Okino et al. |
| 6,433,301 B1 | 8/2002 | Dunsky et al. |
| 6,451,631 B1 | 9/2002 | Grigoropoulos et al. |
| 6,483,973 B1 | 11/2002 | Mazzarese et al. |
| 6,496,301 B1 | 12/2002 | Koplow et al. |
| 6,542,665 B2 | 4/2003 | Reed et al. |
| 6,639,177 B2 | 10/2003 | Ehrmann et al. |
| 6,671,293 B2 | 12/2003 | Kopp et al. |
| 6,777,645 B2 | 8/2004 | Ehrmann et al. |
| 6,917,742 B2 | 7/2005 | Po |
| 6,989,508 B2 | 1/2006 | Ehrmann et al. |
| 7,116,887 B2 | 10/2006 | Farroni et al. |
| 7,148,447 B2 | 12/2006 | Ehrmann et al. |
| 7,157,661 B2 | 1/2007 | Amako |
| 7,184,630 B2 | 2/2007 | Kwon et al. |
| 7,257,293 B1 | 8/2007 | Fini et al. |
| 7,317,857 B2 | 1/2008 | Manyam et al. |
| 7,359,604 B2 | 4/2008 | Po |
| 7,382,389 B2 | 6/2008 | Cordingley et al. |
| 7,394,476 B2 | 7/2008 | Cordingly et al. |
| 7,421,175 B2 | 9/2008 | Varnham |
| 7,537,395 B2 | 5/2009 | Savage-Leuchs |
| 7,764,854 B2 | 7/2010 | Fini |
| 7,783,149 B2 | 8/2010 | Fini |
| 7,876,495 B1 | 1/2011 | Minelly |
| 7,920,767 B2 | 4/2011 | Fini |
| 7,924,500 B1 | 4/2011 | Minelly |
| 7,955,905 B2 | 6/2011 | Cordingley et al. |
| 7,955,906 B2 | 6/2011 | Cordingley et al. |
| 8,217,304 B2 | 7/2012 | Cordingley et al. |
| 8,288,683 B2 | 10/2012 | Jennings et al. |
| 8,362,391 B2 | 1/2013 | Partlo et al. |
| 8,395,084 B2 | 3/2013 | Tanaka |
| 8,509,577 B2 | 8/2013 | Liu |
| 8,526,110 B1 | 9/2013 | Honea et al. |
| 8,711,471 B2 | 4/2014 | Liu et al. |
| 8,728,591 B2 | 5/2014 | Inada et al. |
| 8,755,660 B1 | 6/2014 | Minelly |
| 8,781,269 B2 | 7/2014 | Huber et al. |
| 8,809,734 B2 | 8/2014 | Cordingley et al. |
| 8,835,804 B2 | 9/2014 | Farmer et al. |
| 8,953,914 B2 | 2/2015 | Genier |
| 9,140,873 B2 | 9/2015 | Minelly |
| 9,158,066 B2 | 10/2015 | Fini et al. |
| 9,207,395 B2 | 12/2015 | Fini et al. |
| 9,217,825 B2 | 12/2015 | Ye et al. |
| 9,250,390 B2 | 2/2016 | Muendel et al. |
| 9,310,560 B2 | 4/2016 | Chann et al. |
| 9,322,989 B2 | 4/2016 | Fini et al. |
| 9,325,151 B1 | 4/2016 | Fini et al. |
| 9,339,890 B2 | 5/2016 | Woods et al. |
| 9,366,887 B2 | 6/2016 | Tayebati et al. |
| 9,397,466 B2 | 7/2016 | McComb et al. |
| 9,442,252 B2 | 9/2016 | Genier |
| 9,507,084 B2 | 11/2016 | Fini et al. |
| 2002/0050488 A1 | 5/2002 | Nikitin et al. |
| 2002/0136507 A1 | 9/2002 | Musk |
| 2002/0146202 A1 | 10/2002 | Reed et al. |
| 2003/0043384 A1 | 3/2003 | Hill |
| 2003/0095578 A1 | 5/2003 | Kopp et al. |
| 2003/0118305 A1 | 6/2003 | Reed et al. |
| 2003/0219208 A1 | 11/2003 | Kwon et al. |
| 2004/0011772 A1 | 1/2004 | Okumura |
| 2004/0119955 A1* | 6/2004 | Tanaka ................ B23K 26/0732 355/51 |
| 2004/0198028 A1 | 10/2004 | Tanaka et al. |
| 2004/0208464 A1 | 10/2004 | Po |
| 2005/0059265 A1* | 3/2005 | Im ....................... B23K 26/0604 438/795 |
| 2005/0185892 A1 | 8/2005 | Kwon et al. |
| 2005/0265678 A1 | 12/2005 | Manyam et al. |
| 2005/0272185 A1 | 12/2005 | Seki et al. |
| 2006/0019474 A1 | 1/2006 | Inui et al. |
| 2006/0072632 A1 | 4/2006 | Flanders et al. |
| 2006/0237402 A1* | 10/2006 | Nagashima ........ B23K 26/0604 219/121.63 |
| 2006/0254500 A1* | 11/2006 | Im ....................... B23K 26/0738 117/43 |
| 2006/0291788 A1 | 12/2006 | Po |
| 2007/0104438 A1 | 5/2007 | Varnham |
| 2007/0147751 A1 | 6/2007 | Fini |
| 2007/0178674 A1 | 8/2007 | Imai et al. |
| 2007/0296966 A1 | 12/2007 | Benicewicz et al. |
| 2008/0087895 A1* | 4/2008 | Han ................... B23K 26/0613 257/72 |
| 2009/0034059 A1 | 2/2009 | Fini |
| 2009/0059353 A1 | 3/2009 | Fini |
| 2009/0127477 A1 | 5/2009 | Tanaka |
| 2009/0129237 A1 | 5/2009 | Chen |
| 2009/0152247 A1 | 6/2009 | Jennings et al. |
| 2009/0173724 A1 | 7/2009 | Ogino et al. |
| 2010/0277804 A1* | 11/2010 | Galvanauskas .... G02B 27/1006 359/583 |
| 2010/0320086 A1 | 12/2010 | Lee et al. |
| 2011/0163077 A1 | 7/2011 | Partlo et al. |
| 2011/0188016 A1 | 8/2011 | De Jager et al. |
| 2011/0200802 A1* | 8/2011 | Li ....................... B29C 65/8253 428/198 |
| 2011/0248005 A1 | 10/2011 | Briand et al. |
| 2012/0002919 A1 | 1/2012 | Liu |
| 2012/0012594 A1 | 1/2012 | Boegli et al. |
| 2012/0028399 A1 | 2/2012 | Moslehi et al. |
| 2012/0168411 A1 | 7/2012 | Farmer et al. |
| 2012/0197114 A1 | 8/2012 | Emelianov et al. |
| 2012/0260847 A1 | 10/2012 | Van Der Wilt |
| 2013/0148925 A1 | 6/2013 | Muendel et al. |
| 2013/0223792 A1 | 8/2013 | Huber et al. |
| 2013/0251324 A1 | 9/2013 | Fini et al. |
| 2013/0343703 A1 | 12/2013 | Genier |
| 2014/0071421 A1 | 3/2014 | De Jager et al. |
| 2014/0187055 A1 | 7/2014 | Martinsen et al. |
| 2014/0268310 A1 | 9/2014 | Ye et al. |
| 2014/0334788 A1 | 11/2014 | Fini et al. |
| 2015/0125114 A1 | 5/2015 | Genier |
| 2015/0125115 A1 | 5/2015 | Genier |
| 2015/0293300 A1 | 10/2015 | Fini et al. |
| 2015/0316716 A1 | 11/2015 | Fini et al. |
| 2016/0013607 A1 | 1/2016 | McComb et al. |
| 2016/0320685 A1 | 11/2016 | Tayebati et al. |

FOREIGN PATENT DOCUMENTS

| | | |
|---|---|---|
| CN | 1863635 | 11/2006 |
| CN | 101160646 | 4/2008 |
| CN | 101162690 A | 4/2008 |
| JP | 2002-301583 | 10/2002 |
| JP | 2004-039660 | 2/2004 |
| JP | 2008-098595 | 4/2008 |
| JP | 2011-011972 | 1/2011 |
| JP | 2011011972 * | 1/2011 |
| JP | 2011-124476 | 6/2011 |

(56) References Cited

FOREIGN PATENT DOCUMENTS

| JP | 2011124476 | * | 6/2011 |
|---|---|---|---|
| JP | 5073260 | | 11/2012 |
| KR | 10-1991-0007153 | | 9/1991 |
| KR | 10-2003-0095313 | | 12/2003 |
| KR | 10-2009-0017084 | | 2/2009 |
| KR | 10-2011-0044335 | | 4/2011 |
| WO | WO 2007149208 | | 12/2007 |
| WO | WO 2012136434 | | 10/2012 |

OTHER PUBLICATIONS

First Office Action from Chinese Patent Application No. 201410097021.X, dated Jul. 3, 2015, 24 pages (with English translation).
Official Letter from Taiwan Patent Application No. 103105391, dated Jun. 23, 2015, 13 pages (with English translation).
Delmdahl, "The Excimer Laser: Precision Engineering," Nature Photonics 4:286 (May 2010).
"The Digital Display Revolution: Built on Excimer Laser Annealing," available at http://www.coherent.com/downloads/e-newsletter-Whitepaper-FPD-rev2.pdf prior to Jan. 18, 2013 (4 pages).
Decision of Rejection from Chinese Patent Application No. 201410097021.X, dated Dec. 22, 2016, 23 pages (with English translation).
Official Letter from Taiwan Patent Application No. 103105391, dated Dec. 29, 2016, 9 pages (with English translation).
Second Office Action from Chinese Patent Application No. 201410095844.9, dated Nov. 2, 2016, 3 pages (no English translation available).
Decision of Rejection from Korean Patent Application No. 10-2014-0029473, dated Mar. 20, 2017, 6 pages (with English translation).
Decision of Rejection from Korean Patent Application No. 10-2014-0030097, dated Mar. 27, 2017, 6 pages (with English translation).
Third Office Action from Chinese Patent Application No. 201410095844.9, dated Mar. 3, 2017, 3 pages (no English translation available).
Notice of Preliminary Rejection from Korean Patent Application No. 10-2014-0030097, dated Jan. 12, 2016, 14 pages (with English translation).
Official Letter from Taiwan Patent Application No. 103105390, dated Dec. 15, 2015, 17 pages (with English translation).
Official Action from Taiwan Patent Application No. 103105391, dated Feb. 23, 2016, 11 pages (with English translation).
First Office Action from Chinese Patent Application No. 201410095844.9, dated Apr. 5, 2016, 18 pages (with English translation).
Second Office Action from Chinese Patent Application No. 201410097021.X, dated Apr. 22, 2016, 21 pages (with English translation).
Notice of Preliminary Rejection from Korean Patent Application No. 10-2014-0030097, dated Jul. 25, 2016, 14 pages (with English translation).
Notification of Reexamination (w/English translation) received in Chinese Application No. 201410097021.X, dated Aug. 30, 2017, 27 pages.
Notice of Preliminary Rejection from Korean Patent Application No. 10-2014-0029473, dated May 27, 2016, 14 pages (with English translation).
Second Notification of Reexamination from Chinese Application No. 201410097021.X, dated Jan. 15, 2018, 12 pages (with English translation).
Office Action (w/English translation) from Korea Patent Application No. 10-2014-0030097, dated Aug. 3, 2017, 8 pages.
Office Action from Korea Patent Application No. 10-2014-0029473, (w/English translation) dated Jul. 14, 2017, 7 pages.

Fourth Office Action from Chinese Patent Application No. 201410095844.9 (no English translation), dated Jul. 4, 2017, 3 pages.
Daniel et al., "Novel technique for mode selection in a large-mode-area fiber laser," Conference on Lasers and Electro-Optics, OSA Technical Digest (CD), (Optical Society of America), paper CWC5 (2010).
Daniel et al., "Novel technique for mode selection in a multimode fiber laser," Optics Express, 19(13):12434-12439 (Jun. 13, 2011).
Fini, "Bend-compensated design of large-mode-area fibers," Optics Letters, 31(13):1963-1965 (Jul. 1, 2006).
Fini et al., "Bend compensated large-mode-area fibers: achieving robust single-modedness with transformation optics," Optics Express, 21(16), 7 pages (Aug. 5, 2013).
Fini, "Large mode area fibers with asymmetric bend compensation," Optics Express,19(22):21866-21873 (Oct. 20, 2011).
Ghasemi et al., "Beam shaping design for coupling high power diode laser stack to fiber," Applied Optics, 50(18):2927-2930 (Jun. 20, 2011).
Golub, "Laser Beam Splitting by Diffractive Optics," Optics and Photonics News, 3 pages (2004).
Han et al., "Reshaping collimated laser beams with Gaussian profile to uniform profiles," Applied Optics, 22(22):3644-3647 (Nov. 15, 1983).
"How to Select a Beamsplitter," IDEX Optics & Photonics Marketplace, www.marketplace.idexop.com, 5 pages (created Jan. 8, 2014).
Huang et al., "Double-cutting beam shaping technique for high-power diode laser area light source," Optical Engineering, 52(10):106108-1-106108-6 (Oct. 2013).
Kliner, "Mode-Filtered Fiber Amplifier," Sandia National Laboratories, 44 pages (2007).
Kliner et al., "Overview of Sandia's fiber laser program," Proceedings of SPIE, 6952:695202-1-695202-12 (2008) (downloaded Sep. 9, 2017).
Koplow et al., "Single-mode operation of a coiled multimode fiber amplifier," Optics Letters, 25(7):442-444 (Apr. 1, 2000).
Kotlyar et al., "Asymmetric Bessel-Gauss beams," J.Opt. Soc. Am. A, 31(9):1977-1983 (Sep. 2014).
Longhi et al., "Self-focusing and nonlinear periodic beams in parabolic index optical fibres," Journal of Optics B: Quantum and Semiclassical Optics, 6(5):S303-308 (May 2004).
Price et al., "High-brightness fiber-coupled pump laser development," Proceedings of SPIE, 7583:758308-1-758308-7 (downloaded Sep. 12, 2017).
Sanchez-Rubio et al., "Wavelength Beam Combining for Power and Brightness Scaling of Laser Systems," Lincoln Laboratory Journal, 20(2):52-66 (2014).
Romero et al., "Lossless laser beam shaping," J. Opt. Soc. Am. A, 13(4):751-760 (Apr. 1996).
Sun et al., "Optical Surface Transformation: Changing the optical surface by homogeneous optic-null medium at will," Scientific Reports, 5:16032, 10 pages (Oct. 30, 2015).
Xiao et al., "Fiber coupler for mode selection and high-efficiency pump coupling," Optics Letters, 38(7):1170-1172 (Apr. 1, 2013).
Office Action with English Translation received in Korea Application No. 10-2017-0133619, dated Dec. 19, 2017, 16 pages.
Decision of Rejection from Korean Patent Application No. 10-2017-0133619, dated Jul. 11, 2018, 6 pages (with English translation).
Third Office Action from Chinese Patent Application No. 201410097021.X, dated Sep. 19, 2018, 9 pages (with English translation).
Decision of Rejection and Decision of Refusal of Amendment from Korean Patent Application No. 10-2017-0133619, dated Nov. 12, 2018, 5 pages (with English translation).

* cited by examiner

THERMAL PROCESSING WITH LINE BEAMS

FIELD

The disclosure pertains to multi-wavelength laser-based materials processing.

BACKGROUND

Many manufacturing processes include one or more laser-based processing steps. Exposure to pulsed laser beams can be used for material ablation, recrystallization, annealing, or other processes. For example, pulsed laser beams have been used to locally melt amorphous silicon layers to promote local crystallization. In other examples, laser pulses are applied to remove surface layers based on an ablation process. Continuous wave lasers have been used in welding and other processes. Such laser based processes permit precise control of processed areas, and some beams can be conveniently delivered with optical fiber based beam delivery systems. However, available processing methods are limited due to the inherent optical response of materials to a selected wavelength. These limitations tend to constrain the types of materials processing and the achievable performance available with laser-based optical processing.

SUMMARY

Exposure apparatus comprise a first optical fiber coupled to receive a first optical beam and a second optical fiber coupled to receive a second optical beam. The first optical beam is associated with a first wavelength and the second optical beam is associated with a second wavelength. An optical system is situated to receive the first optical beam from the first optical fiber and the second optical beam from the second optical fiber and direct a first line beam and second line beam, respectively, to a surface of a substrate. In some examples, the first and second line beams have respective lengths and widths, wherein the lengths are greater than the widths, and partially overlap at the surface of the substrate in an area having a length corresponding to at least one of the lengths. In other examples, the first and second line beams have respective lengths and widths, wherein the lengths are greater than the widths, and the first and second line beams are spaced apart at the surface in a direction corresponding to the at least one width. In representative examples, the first line beam has an area greater than an area of the second line beam, and the area of second line beam is contained within the area of first line beam at the surface. In some alternatives, the first wavelength and the second wavelength are different wavelengths and the first line beam and the second line beam substantially overlap at the surface of the substrate. In further embodiments, the first optical beam is a pulsed optical beam associated with a first pulse duration and a first pulse repetition rate, and the second optical beam is a pulsed optical beam associated with a second pulse duration and a second pulse repetition rate. Typically, the first pulse duration and the second pulse duration are different, or the first pulse repetition rate and the second pulse repetition rate are different.

In additional examples, the first line beam has an area on the surface of the substrate that is larger than an area of the second line beam, and the first optical beam is at a wavelength having a smaller absorption coefficient in the substrate than the second wavelength. In some embodiments, the first optical fiber has a core diameter that is different than a core diameter of the second optical fiber. In other examples, a scanning system is operable to scan the line beams such that the first line beam is scanned across the substrate area before the second line beam. In still further examples, the first line beam is configured to heat an area of the substrate prior to exposure of the area of the substrate to the second line beam. In other alternatives, the optical system includes a first optical system and a second optical system, wherein the first optical system is situated to form the first line beam and the second optical system is situated to form the second line beam. According to other examples, the first line beam is configured to weld the substrate and the second line beam is configured to anneal the welded substrate.

Methods comprise selecting a first optical beam from a first laser and a second optical beam from a second laser, wherein the first and second optical beams are at different wavelengths. In some examples, one or both of the first and second optical beams are pulsed optical beams. The first optical beam and the second optical beam are shaped, and a first surface of a substrate is exposed to the selected and shaped optical beams. Typically, an area of the first shaped optical beam is greater that an area of the second shaped optical beam. In some examples, the first and second shaped beams at least partially overlap at the first surface of the substrate. In other examples, the first and second shaped beams are reflected at a second surface of the substrate opposite the first surface of the substrate. According to other examples, the substrate has a thickness and the first shaped beam is incident to the substrate so as to be substantially absorbed in propagating along the thickness. The second shaped beam is reflected from a second surface of the substrate opposite the first surface of the substrate. In further examples, the first shaped beam is selected for thermal processing of a substrate and the second shaped beam is selected to relieve stress in the substrate. In some embodiments, the first shaped beam is selected to be substantially absorbed proximate the first surface of the substrate. In other examples, the substrate comprises a conductive layer situated on the first surface, and the first shaped beam is selected to be substantially absorbed in the conductive layer and the second shaped beam is selected to be absorbed in the substrate. In a particular example, the first shaped beam is selected to ablate the conductive layer. In additional examples, the substrate is a semiconductor substrate comprising a doped region proximate the first surface, and the first shaped beam is selected to diffuse the dopant into the semiconductor substrate.

Methods comprise determining an absorption coefficient for a substrate at a selected wavelength. A beam is focused into the substrate so that power per unit area absorbed by the substrate from an optical beam is constant over a propagation distance in which optical beam power is attenuated by a factor of 2, 3, 5, or 10.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections.

As used herein, optical beam refers to propagating electromagnetic radiation, typically at wavelengths between about 20 µm and 100 nm. In some examples, wavelengths between about 400 nm and 2 µm are preferred.

Figure 1:
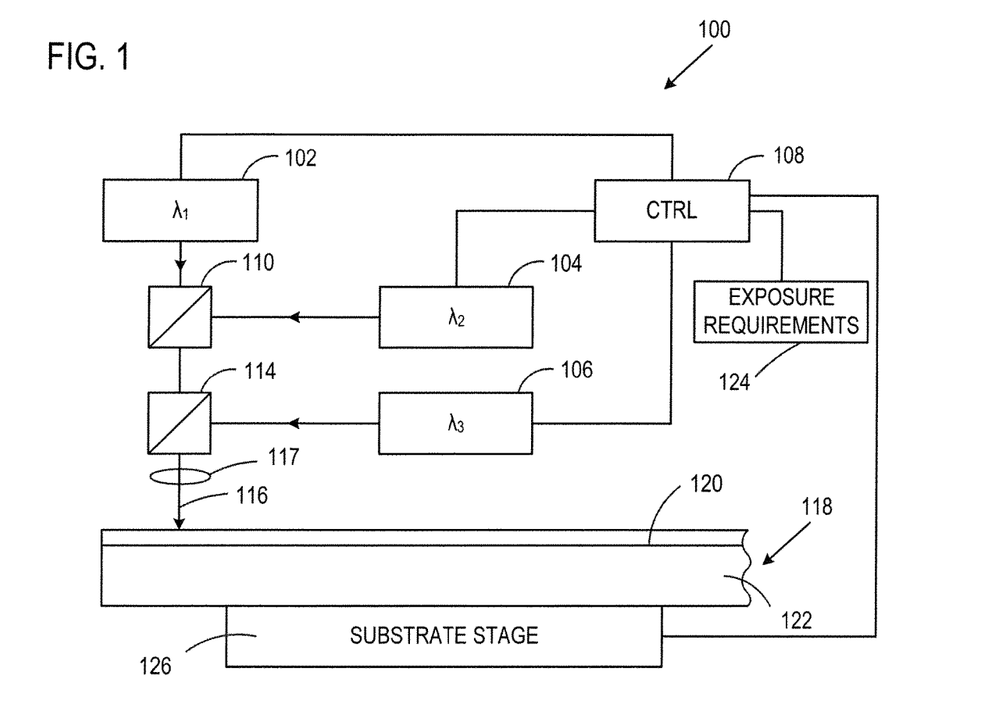
FIG. 1 is a schematic diagram of a multi-wavelength, multi-laser processing system configured to provide spatially overlapping beams of different wavelengths.

With reference to FIG. 1, a processing system 100 includes lasers 102, 104, 106 that provide pulses or continuous optical beams at first, second, and third wavelengths, respectively. Two or more lasers can be provided in other examples, or a single laser can be configured to produce multi-wavelength optical pulses such as by harmonic generation or other non-linear process, or the single laser can be wavelength tunable. While three distinct wavelengths are used in the example of FIG. 1, these wavelengths need not be distinct, and one or more lasers can provide a common wavelength so as to provide additional power at the common wavelength, or to provide a selected mixture of continuous optical power, or mixtures of different pulse durations and pulse repetition rates.

As shown in FIG. 1, a cube beam splitter 110 is situated to receive beams from the lasers 102, 104 and direct the combined beams along an axis 116 to a cube beam splitter 114. The combined beam from the lasers 102, 104 is combined with a beam from the laser 106 at the cube beam splitter 114 so that all three beams are combined and propagate along the axis 116 to a substrate 118. The combined beams are formed into an appropriate beam shape such as a line beam or a focused spot with a beam shaping optical system 117. Although the beams propagate along a common axis, the beams from the lasers 102, 104, 106 can be displaced from each other or propagate at different angles with respect to the axis 116 so as to be shaped or directed differently by the beam shaping optical system 117. In some examples, the beam shaping optical system 117 includes a beam homogenizer and one or more cylindrical lenses configured to produce a homogenized, multi-wavelength line beam at the substrate 118.

The system 100 of FIG. 1 is shown with cube beam splitters. In some examples, cube beam splitters include wavelength dependent dielectric filters that transmit or reflect beams at various wavelengths as needed to produce a selected wavelength combination. Plate beam splitters can also be used, and different angles of incidence for the various beams can be used, and a 45 degree angle of incidence to a cube beam splitter dichroic layer is shown in FIG. 1 for convenient illustration. Polarizing beam splitters can be used to combine polarized laser beams at different wavelengths or the same wavelength, and wave plates can be inserted to establish suitable states of polarization (SOPs) at polarizing beam splitters.

The lasers 102, 104, 106 are coupled to a control system 108 that is used to select beam powers, pulse energies, repetition rates, and wavelength combinations. A memory or other computer readable device 124 is configured to store exposure requirements for the substrate 118. In other examples, the controller receives scan requirements with a local area network or a wide area network, and includes a network adaptor such as an Ethernet adaptor. The control system 108 is also coupled to a mechanical stage 126 that positions and scans the substrate 118 with respect to the combined optical beams. In some examples, the beam shaping optical system and other portions of a beam delivery optical system are movable so as to direct the combined beams to suitable substrate locations. In other examples, both the optical beam and the substrate 119 can be translated or scanned.

The substrate 118 includes a surface layer 120 and a bulk substrate layer 122. The surface layer can be an amorphous silicon layer, an indium tin oxide layer, or other layers, and the bulk substrate 122 can be glass, silicon, or other dielectric, semiconductor, or conductive material such as metals or plastics. In addition, the control system 108 can also be coupled to an inspection or measurement apparatus that monitors processing, beam powers, and other process parameters so that the control system 108 can report process parameters, communicate error notifications, halt processing, or issue process reports based on actual exposure parameters.

Figure 2:
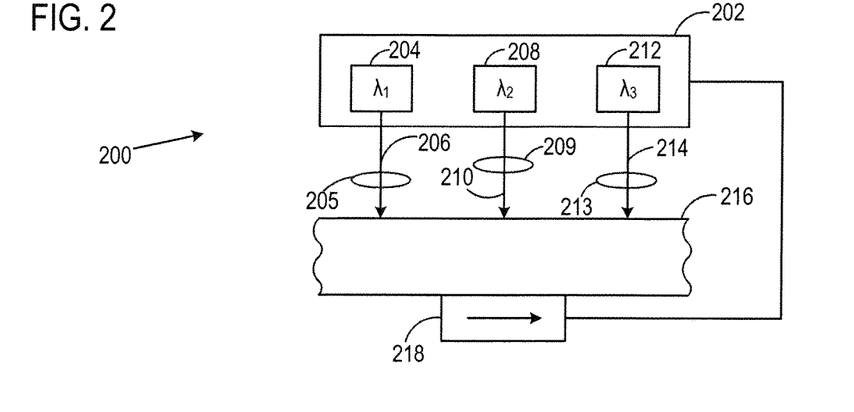
FIG. 2 is a schematic diagram of a multi-wavelength, multi-laser processing system configured to sequentially provide beams of different wavelengths to a common substrate area.

With reference to FIG. 2, an exposure apparatus 200 includes an optical scanning system that includes lasers 204, 208, 212 that produce optical beams at first, second, and third wavelengths, respectively. A beam from the laser 204 is directed along an axis 206 and shaped by a beam shaping optical system 205 for delivery to ta substrate 216. Beams from the lasers 208, 212 are directed along respective axes 210, 214 and shaped by respective beam shaping optical systems 209, 213 for delivery to the substrate 216. The optical scanning system is coupled to a mechanical stage 218 so that the substrate can be moved with respect to the axes 206, 210, 214 continuously or step-wise.

As shown in FIG. 2, the substrate 216 is moved so that a selected substrate area encounters beams from the lasers 204, 208, 212 sequentially, beginning with the beam from the laser 212. Beam parameters can be independently adjusted for each of the beams, and the beams can be shaped to be incident to different areas or partially overlap.

Figure 3:
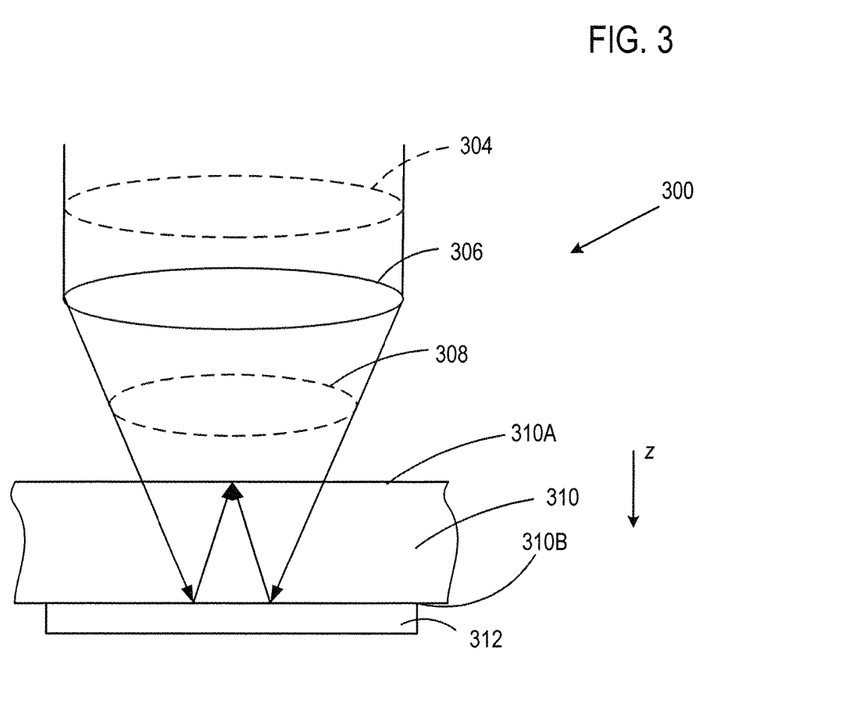
FIG. 3 illustrates a substrate having a layer configured to reflect a processing beam so as tailor beam absorption in a substrate.

Selections of beam wavelengths, pulse durations, beam shapes and other beam characteristics can be selected depending on a particular application and substrate. Beam focus can be adjusted to determine position dependent beam absorption in the substrate as well. Referring to FIG. 3, an input optical beam 304 is focused by a lens 306 to form a converging beam 308 that is directed to a substrate 310. The optical beam 304 can include optical radiation at a plurality of wavelengths so that different wavelengths portions are absorbed differently. For a substrate material having absorption coefficients $a_1$, $a_2$, and $a_3$ for three different beam wavelengths, beam intensities in the substrate 310 as a function of initial (surface) intensity are proportional to $\exp(-a_1 z)$, $\exp(-a_2 z)$, $\exp(-a_3 z)$, respectively. By suitable selection of wavelengths and initial beam intensities, energy absorption in the substrate 310 can be customized. In some examples, a more uniform volume heating is achieved. In addition, a beam focal distance can be selected so that some or all wavelength portions are at focus positions interior to or through the substrate 310. For example, beams at one or more wavelengths can be focused at a front surface 310A but after reflection by a reflective layer 312 provided on an exit surface 310B. The reflective layer 312 thus can permit more uniform beam absorption as well as more efficient use of beam power that might otherwise exit the substrate 310. In some cases, a reflective surface is situated below a substrate for the same purpose.

Figure 4:
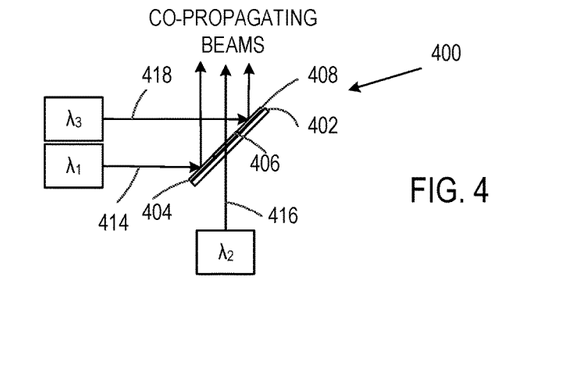
FIG. 4 illustrates beam interleaving to produce a multi-wavelength optical beam.

An alternative apparatus for directing a plurality of independent beams to a substrate is illustrated in FIG. 4. A beam interleaver 400 includes a substrate 402 such as a glass or other transparent plate that is provided with dielectric coatings 404, 406, 408. In this example, the dielectric coatings 404, 408 are selected to reflect optical beams propagating along axes 414, 418 and the dielectric coating 406 is configured to transmit an optical beam received along an axis 416. The combined beams are co-propagating in that they are directed along a common axis but are displaced.

Beam interleavers can be configured with other arrangements of reflective and transmissive areas. Some or all wavelengths can be the same or different, as may be suited to a particular application.

Figure 5A:
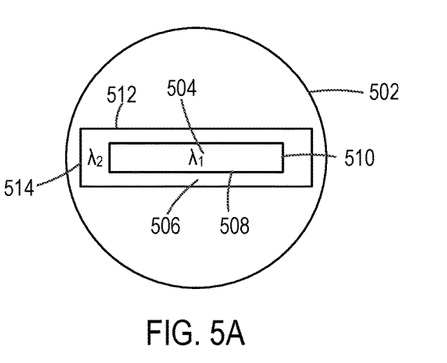
FIG. 5A illustrates a substrate area exposed to beams of different areas that are overlapping.
Figure 5B:
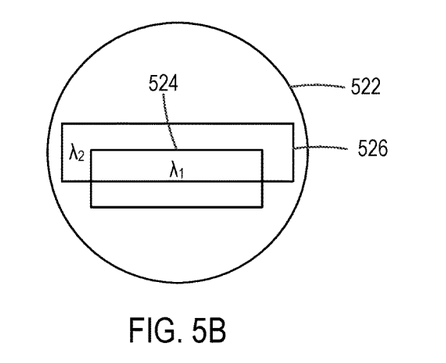
FIG. 5B illustrates a substrate area exposed to beams of areas that are partially overlapping.

Multi-wavelength multi-beam processing can be used in a variety of applications. In an example shown in FIG. 5A, a substrate 502 is exposed to a first beam in a substrate area 504. The area of the first beam on the substrate 504 is associated with a length 508 and a width 510. The first beam can be associated with a large, rapid temperature rise such as needed for a welding or soldering operation. Thermal stresses associated with a welding operation in the substrate area 504 can be mitigated by exposing the substrate 502 to a second beam in a substrate area 506. The area of the second beam on the substrate 506 is associated with a respective length 512 and a respective width 514. In FIG. 5A, the area of the second beam on the substrate 506 is greater than the area of the first beam on the substrate 504, and the area of the first beam on the substrate 504 is contained within the area of the second beam on the substrate 506. FIG. 5B illustrates the area of a first beam on a substrate 524 and the area of a second beam on a substrate 526 are partially overlapped. The second beam can be at the same or a different wavelength, and have absorption characteristics so as to be absorbed to heat a selected volume of the substrate 502. Such a second or "stress relief" beam can be applied prior to exposure to the first beam, during exposure to the first beam, or after exposure to the first beam. Suitable wavelengths are selected based on substrate properties and any layers or features defined in or on the substrate. Silicon substrates become transmissive in the near infrared, and have rapidly varying values of absorption coefficient between about 800 nm and 1 μm, so that wavelengths in this range can be used to provide different absorption rates. Plastics and glasses tend to be absorptive at longer wavelengths, and beams at wavelengths between about 1.5 μm and 2.5 μm may be appropriate.

Figure 6:
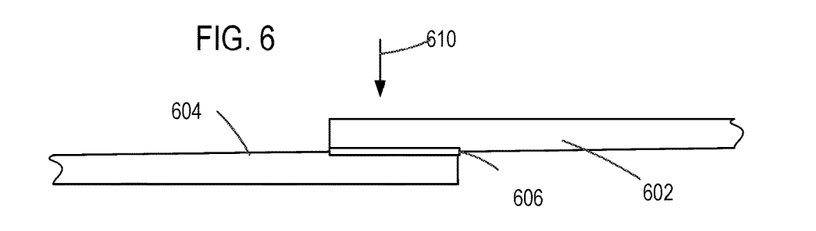
FIG. 6 illustrates lap welding with a combined beam.

As shown in FIG. 3, substrates can be configured to accommodate various processes by including reflective, absorptive, or other layers. In some cases, substrates to be processed contain layers that can be used as reflective or absorptive layers, and special purpose layers may not be needed. Referring to FIG. 6, substrates 602, 604 are situated to be lap welded by exposure to an optical beam 610. A wavelength of the optical beam 610 can be selected so that the optical beam 610 is transmitted to an absorbing layer 606 that is provided to one or both of the substrates 602, 604. Optical heating of the absorbing layer 606 can permit welding of the substrates 602, 604. In other examples, the substrates 602, 604 are illuminated on both sides to provide more uniform heating. The optical beam 610 can include a first beam portion that is selected to heat the substrates 602, 604 without welding, and a second beam portion is then applied to complete the welding.

Some processing procedures require heating to a particular temperature. In some cases, it can be desirable to preheat a selected area so that a smaller temperature change is required for processing. For example, a first, relatively long duration optical pulse can produce a temperature rise, and then application of a much shorter optical pulse can be used to achieve the target temperature so that the target is at the target temperature for a shorter time than would be available from first pulse alone.

Other examples of multi-beam processing include using a first beam to heat a flexible substrate over a large area, and a second beam to provide local heating for a particular process so as to reduce or eliminate substrate warp or bow due to local heating. In other examples, substrate heating is controlled to prevent unwanted dopant migration of semiconductor dopants. Multiple beams can be used to heat more uniformly and avoid activation temperatures at which dopants are mobile. In other examples, a temperature rise in a substrate preheated with a first beam is below an activation temperature. Application of a second beam to a small area in a short pulse allows dopant migration but only over a small area and for a short time.

Additional thermal processes that can include multi-beam, multi-spectral exposures include so called rapid thermal processing. Heating rates and volumes and areas heated can be selected based on a selection of pulse durations, wavelengths, and beam shapes. For example, local areas (lines or spots) can be heated with a first (short) pulse, and cool down controlled by application of one or more additional pulses or a series of pulses following the first pulse and at the same or different spacings. Heating can be similarly controlled with a plurality of pulses applied at different times (and with different areas, wavelengths, or durations). Energy can be deposited at various depths based on the dependence of absorption coefficient on wavelength. Thus, thermal temporal and spatial gradients can be controlled during heating and cooling periods. Thermal processes based on multi-beam, multi-spectral methods as described herein can be used to activate dopants, change layer and substrate interface structures, increase layer density, crystallize or partially crystallize layers, anneal, weld, diffuse dopants such as phosphorus diffusion in solar cell manufacturing, passivation, and pattern definition. In another example, a first beam can be used to weld, and a second beam applied to anneal the weld.

Figure 8:
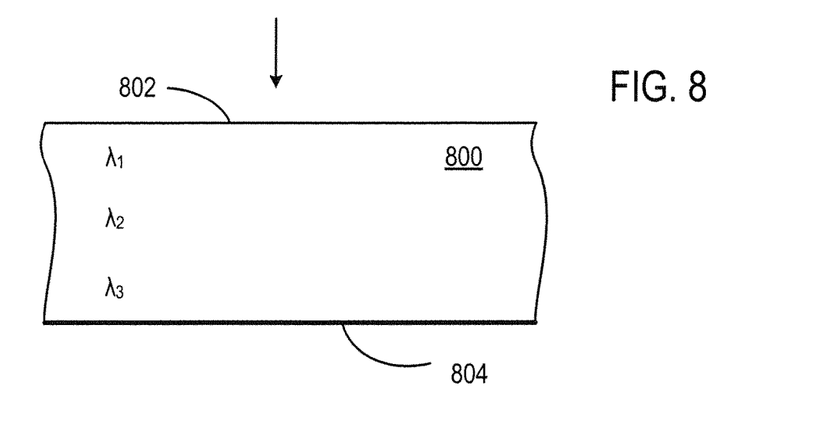
FIG. 8 illustrates multi-wavelength absorption in a substrate.

Although selection of heating profiles in materials can be complicated by thermal diffusion rates, multi-spectral exposures permit energy deposition to be more readily controlled. As shown schematically in FIG. 8, an input beam can contain spectral components at three wavelengths selected to have decreasing absorption coefficients. Although power at the first wavelength is deposited proximate an entrance surface 802 of a substrate 800 and substantially depleted, second and third wavelengths continue to be absorbed further into the substrate 800. A reflector 804 can reflect portion of some or all incident wavelengths back toward the entrance surface 802 as well.

Figure 9:
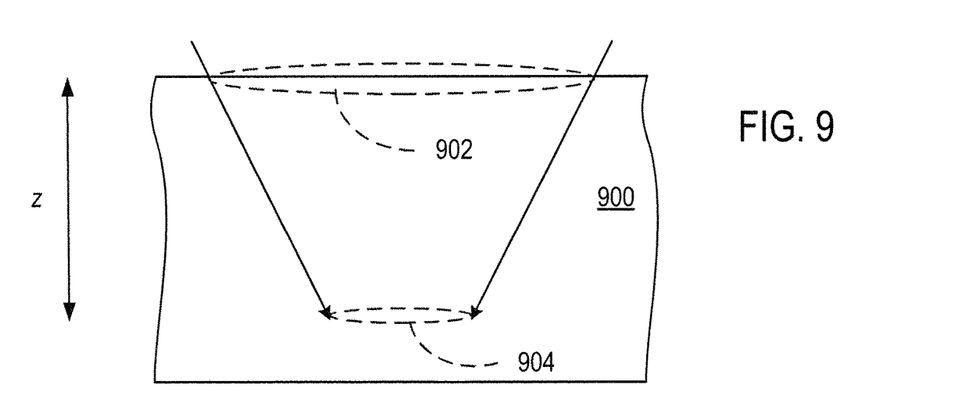
FIG. 9 illustrates a focused beam having a controlled energy deposition per unit volume.

In yet another example, beam area can be varied to provide a preferred energy distribution. For example, as shown in FIG. 9, a beam of area 902 is input to a substrate 900 and is focused to have an area 904 at a depth z. If a substrate absorption coefficient is $\alpha$ and the areas are $A_0$ and $A_z$, then constant energy per unit volume is deposited if $A_z/A_0 = \exp(-\alpha z)$. Typically, beam areas for focused beams vary linearly or quadratically depending on location with respect to a beam waist, and constant energy per unit volume cannot be established over any significant distance except for small absorption coefficients. As used herein, substantially constant energy per unit volume refers to values that vary by less than 5%, 10%, 20%, 50%, or up to factors of 2 over propagation lengths of 0.1, 0.2, 0.5, 1, 2 times the material absorption coefficient or over which optical power is attenuated by factors of 2, 3, 5, or 10.

Figure 7A:
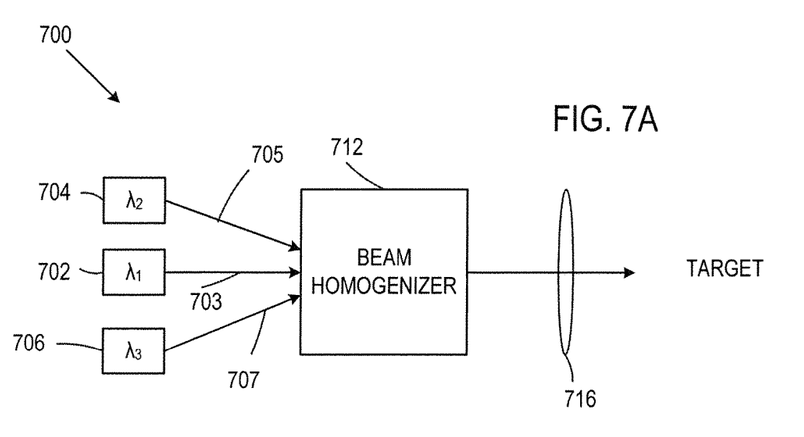
FIG. 7A illustrates an optical system for multi-spectral exposures.

In another example, shown in FIG. 7A, a multi-beam delivery system 700 includes lasers 702, 704, 706 that are coupled via respective optical fibers 703, 705, 707 to a beam homogenizer 712. A beam shaping optical element 716 such as one or more cylindrical or spherical lenses shapes the homogenized beam for delivery to target. The beam homogenizer can be a slab light guide or wave guide such as disclosed in Farmer et al., U.S. Patent Application Publ. 20120168411, which is incorporated herein by reference. Output beam shape using the configuration of FIG. 7A tends to be the same for all input beams, but in some cases, the beam shaping optical element 716 can focus various wavelengths differently.

Figure 7B:
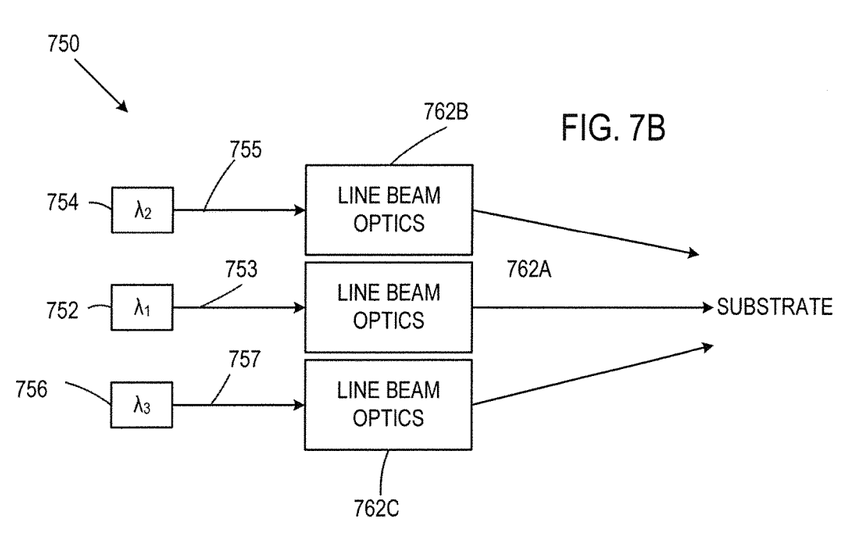
FIG. 7B illustrates a system that produces three overlapping or non-overlapping line beams.
Figure 10:
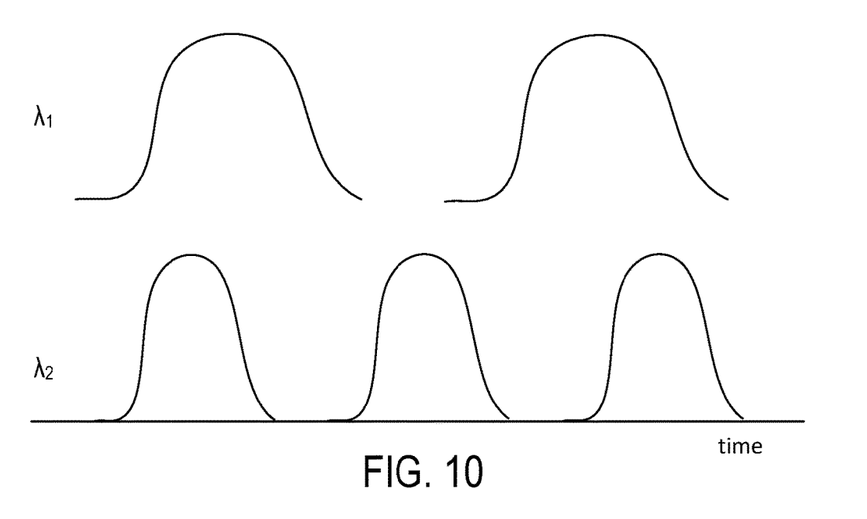
FIG. 10 illustrates two beams have different pulse durations and repetition rates.

In an example shown in FIG. 7B, a multi-beam delivery system 750 includes lasers 752, 754, 756 that are coupled via respective optical fibers 753, 755, 757 to respective line beam optics 762A-762C. Line beams associated with each of the lasers 752, 754, 756 are directed to a substrate. The beams can overlap, partially overlap, or be separated. Beam size can be selected based on line beam optics (which can be different for each laser) or the selected optical fibers 753, 755, 757. Beam area can also be determined by a defocus, and the line beam optics 762A-762C can be decentered with respect to one or more of the optical fibers 753, 755, 757. The lasers 752, 754, 756 are independently selectable, and can be the same or different types of lasers, and produce beams of various wavelengths, pulse durations, and repetition rates. An example of two laser beams having different wavelengths, pulse durations, and repetition rates is shown in FIG. 10.

Although laser diode-based systems are convenient, various laser sources can be used. Some examples include pulsed and continuous laser diodes, solid state lasers, excimer lasers, diode pumped fiber lasers, and optical harmonics and other nonlinear products of any laser. In some examples, unabsorbed pump radiation such as from a laser diode is allowed to propagate along with the associated laser beam to a target.

Having described and illustrated the principles of the disclosed technology with reference to the illustrated embodiments, it will be recognized that the illustrated embodiments can be modified in arrangement and detail without departing from such principles. Technologies from any example can be combined with the technologies described in any one or more of the other examples. It will be appreciated that procedures and functions such as those described with reference to the illustrated examples can be implemented in a single hardware module, or separate modules can be provided. The particular arrangements above are provided for convenient illustration, and other arrangements can be used. We claim as our invention all that comes within the scope and spirit of these claims.

We claim:

1. An exposure apparatus, comprising:
   a first optical fiber coupled to receive a first pulsed optical beam;
   a second optical fiber coupled to receive a second pulsed optical beam, wherein the first pulsed optical beam is associated with a first wavelength and the second pulsed optical beam is associated with a second wavelength; and
   an optical system situated to receive the first pulsed optical beam from the first optical fiber and the second pulsed optical beam from the second optical fiber and direct a first line beam and second line beam, respectively, to a surface of a substrate, wherein the first line beam and the second line beam are spaced apart so as to be directed to a first surface area of the substrate and a second area of the substrate, respectively, wherein the first surface area and the second surface area are different and non-overlapping.

2. The exposure apparatus of claim 1, wherein the first and second line beams have respective lengths and widths, wherein the lengths are greater than the widths, and the first and second line beams are spaced apart at the surface in a direction corresponding to a greater of the widths.

3. The exposure apparatus of claim 1, wherein the first pulsed optical beam has a first pulse duration and a first pulse repetition rate, and the second pulsed optical beam has a second pulse duration and a second pulse repetition rate, wherein at least the first pulse duration and the second pulse duration are different, or the first pulse repetition rate and the second pulse repetition rate are different.

4. The exposure apparatus of claim 1, wherein the first line beam has an area on the surface of the substrate that is larger than an area of the second line beam on the surface of the substrate, and the first optical beam is at a wavelength having a smaller absorption coefficient in the substrate than the second wavelength.

5. The exposure apparatus of claim 1, wherein the first optical fiber has a core diameter that is different than a core diameter of the second optical fiber.

6. The exposure apparatus of claim 1, further comprising a scanning system configured to scan the line beams such that the first line beam is scanned across the substrate area before the second line beam.

7. The exposure apparatus of claim 6, wherein the first line beam is configured to heat an area of the substrate prior to exposure of the area of the substrate to the second line beam.

8. The exposure apparatus of claim 1, wherein the optical system includes a first optical system and a second optical system, wherein the first optical system is situated to form the first line beam and the second optical system is situated to form the second line beam.

9. An exposure apparatus, comprising:
a first optical fiber coupled to receive a first pulsed optical beam;
a second optical fiber coupled to receive a second pulsed optical beam, wherein the first pulsed optical beam is associated with a first wavelength and the second pulsed optical beam is associated with a second wavelength; and
an optical system situated to receive the first pulsed optical beam from the first optical fiber and the second pulsed optical beam from the second optical fiber and direct a first line beam and second line beam sequentially, to a surface of a substrate, wherein the substrate is a first substrate, and the first line beam is configured to weld the first substrate and a second substrate, and the second line beam is configured to anneal a welded region of the first and second substrates, wherein a selected area of the surface of the substrate is processed by the first line beam and then translated to receive the second line beam for sequential welding and annealing by the first pulsed optical beam and the second pulsed optical beam, respectively.

10. A method, comprising:
selecting a first pulsed optical beam from a first laser and a second pulsed optical beam from a second laser, wherein the first and second pulsed optical beams are at different wavelengths in a range from 800 nm to 1000 nm;
shaping the first optical beam and the second optical beam; and
exposing a first surface of a substrate to the selected and shaped pulsed beams, wherein an area of the first shaped optical beam is greater than an area of the second shaped optical beam and wherein during the exposing, the area of the substrate exposed to the first shaped optical beam and the area of the substrate exposed to the second shaped optical beam are different and non-overlapping.

11. The method of claim 10, further comprising reflecting the first and second shaped pulsed beams from a second surface of the substrate opposite the first surface of the substrate.

12. The method of claim 10, wherein the substrate has a thickness and the first shaped pulsed beam is incident to the substrate so as to be substantially absorbed in propagating along the thickness, and further comprising reflecting the second shaped pulsed beam from a second surface of the substrate opposite the first surface of the substrate.

13. The method of claim 10, wherein the first shaped pulsed beam is selected for thermal processing of a substrate and the second pulsed shaped beam is selected to relieve stress in the substrate.

14. The method of claim 10, wherein the first shaped pulsed beam is selected to be substantially absorbed proximate the first surface of the substrate.

15. The method of claim 14, wherein the substrate comprises a conductive layer situated on the first surface, and the first shaped pulsed beam is selected to be substantially absorbed in the conductive layer and the second shaped pulsed beam is selected to be absorbed in the substrate.

16. The method of claim 15, wherein the first shaped pulsed beam is selected to ablate the conductive layer.

17. The method of claim 10, wherein the substrate is a semiconductor substrate comprising a doped region proximate the first surface, and the first shaped pulsed beam is selected to diffuse the dopant into the semiconductor substrate.

18. A method, comprising:
selecting a first pulsed optical beam from a first laser and a second pulsed optical beam from a second laser, wherein the first and second pulsed optical beams are at different wavelengths;
shaping the first optical beam and the second optical beam; and
exposing a first surface of a substrate to the selected and shaped pulsed beams, wherein an area of the first shaped optical beam is greater than an area of the second shaped optical beam, wherein the substrate comprises a surface layer, a bulk substrate layer, and a reflective layer, wherein the exposed surface of the substrate is an exterior surface of the surface layer, and further comprising reflecting the first and second shape pulsed beams at the reflective layer of the substrate after transmission through the surface layer and the bulk substrate.

19. The method of claim 10, wherein the first pulsed optical beam and the second pulsed optical beam are selected so as to be associated with first and second wavelengths, respectively, so as to control a heating profile in the substrate, wherein the selected first wavelength of the first pulsed optical beam is associated with a first absorption coefficient, and the selected second wavelength of the second pulsed optical beam is associated with a second absorption coefficient.

20. The method of claim 10, wherein the first optical beam is shaped so as to have a first focus position along a depth direction in the substrate, and the second optical beam is shaped so as to have a second focus position along the depth direction in the substrate, further wherein the pulsed optical beam associated with the smaller absorption coefficient is shaped so as to focus in the substrate a farther along the depth direction than the pulsed optical beam associated with the larger absorption coefficient.

21. The method of claim 10, further comprising selecting a third pulsed optical beam from a third laser, wherein a wavelength associated with the third optical pulsed optical is different from the first and second wavelengths and is associated with a third absorption coefficient that is different from the first and second absorption coefficients.

22. The exposure apparatus of claim 1, wherein the first pulsed optical beam has a first focus position along a depth direction in the substrate and the second pulsed optical beam has a second focus position along the depth direction in the substrate, wherein the first focus position and the second focus position are different.

23. The exposure apparatus of claim 6, wherein the scanning system is configured so that a selected substrate area is exposed to the first pulsed optical beam and then to the second pulsed optical beam.

\* \* \* \* \*